(12) United States Patent
Preuss

(10) Patent No.: US 7,422,090 B1
(45) Date of Patent: Sep. 9, 2008

(54) CALIPER BRAKE ASSEMBLY

(76) Inventor: Adam Preuss, 519 Jefferson St., Santa Rosa, CA (US) 95401

( * ) Notice: Subject to any disclaimer, the term of this patent is extended or adjusted under 35 U.S.C. 154(b) by 0 days.

(21) Appl. No.: 11/881,107

(22) Filed: Jul. 24, 2007

(51) Int. Cl.
*B62L 1/16* (2006.01)
(52) U.S. Cl. .................. 188/24.12; 188/24.21
(58) Field of Classification Search .... 188/24.11–24.22
See application file for complete search history.

(56) References Cited

U.S. PATENT DOCUMENTS

| | | | | |
|---|---|---|---|---|
| 4,014,408 A | * | 3/1977 | Armstrong | 188/24.15 |
| 4,015,690 A | * | 4/1977 | Armstrong | 188/24.15 |
| 4,391,352 A | * | 7/1983 | Brown | 188/24.12 |
| 4,842,102 A | * | 6/1989 | Tateyama et al. | 188/24.21 |
| 5,913,388 A | * | 6/1999 | Ota et al. | 188/24.22 |

* cited by examiner

*Primary Examiner*—Christopher P Schwartz
(74) *Attorney, Agent, or Firm*—Dergosits & Noah LLP

(57) ABSTRACT

Caliper brake assembly for engaging a rimmed wheel on a frame of a bicycle. First and second brake arms are provided having brake pads supported on first ends thereof and bores extending therethrough for receiving a bolt for providing a pivot point for the pivotal attachment of the first and second brake arms to the bicycle frame. A spring is associated with the first and second arms to bias their brake pads away from the rimmed wheel. A rocker assembly is included in the caliper brake assembly which includes a rocker arm pivotally appended to a second end of the first brake arm, the rocker assembly having a region for fixedly receiving a control cable and a region for pivotally receiving a link, the link provided for pivotally connecting the rocker arm proximate to a second end of the second brake arm.

5 Claims, 3 Drawing Sheets

CALIPER BRAKE ASSEMBLY

TECHNICAL FIELD

The present invention involves a caliper brake assembly which employs a sub-assembly in the form of a rocker arm and supporting elements which increase the mechanical advantage in applying brake pads against their associated wheel rims.

BACKGROUND OF THE INVENTION

Caliper brake assemblies used to apply frictional braking force to a rimmed bicycle wheel are commonplace. FIG. 1 illustrates such a device. Specifically, a shaft appended to hexagonal nut 11 is mounted on the bicycle frame. Helical or torsion spring 13 is inserted as shown and serves to keep brake shoes 12 away from the bicycle wheel to prevent frictional braking unless braking action is applied, usually through the actuation of a hand brake assembly causing movement of cable 5. In applying braking action, brake stirrups 17 and 18 pivot along a bolt behind hex nut 11 drawing brake pads 12 against their associated wheel rim. When the hand brake assembly is released, cable 5 is extended causing brake pads 12 to move apart through the action of bias spring 13.

In operating with the assembly of FIG. 1, it is quite apparent that the extent of braking force is directly proportionally to the force applied through associated hand brakes as translated through cable 5. As a consequence, there has been some thought given to increasing the mechanical advantage between the force applied to hand brakes and the consequent frictional contact between the brake pads and wheel rim.

As an illustration, reference is made to U.S. Pat. No. 3,628,635 as well as U.S. Pat. No. 7,000,739. In each instance, cam mechanisms were disclosed in order to provide a mechanical advantage in translating force developed from a braking operation to the actual braking mechanism. However, these brakes tend to be complex, unduly heavy and create frictional resistance far greater than that imposed by traditional caliper brakes. As such, there is yet to be a practical solution to the need for translating hand applied braking action through a mechanical advantage to a caliper brake positioned adjacent a bicycle wheel.

It is thus an object of the present invention to provide a caliper brake for use with a bicycle wheel rim which results in a mechanical advantage while avoiding the drawbacks of prior art.

This and further advantages are more readily apparent when considering the following disclosure and appended claims.

SUMMARY OF THE INVENTION

A caliper brake assembly for engaging a rimmed wheel on the frame of a bicycle comprising first and second brake arms, said second and first brake arms having brake pads supported on first ends thereof and bores extending therethrough for receiving a bolt for providing a pivot point for the pivotal attachment of said first and second brake arms to said frame, a spring associated with said first and second arms to bias said brake arms away from said rimmed wheel, a rocker assembly comprising a rocker arm pivotally appended to a second end of said first brake arm, said rocker arm having a region for fixedly receiving a control cable and a region for pivotally receiving a link, the link pivotally connecting said rocker arm proximate a second end of said second brake arm capable of applying tension and comprehension between said first and second brake arms.

DETAILED DESCRIPTION OF THE INVENTION

Figure 2:
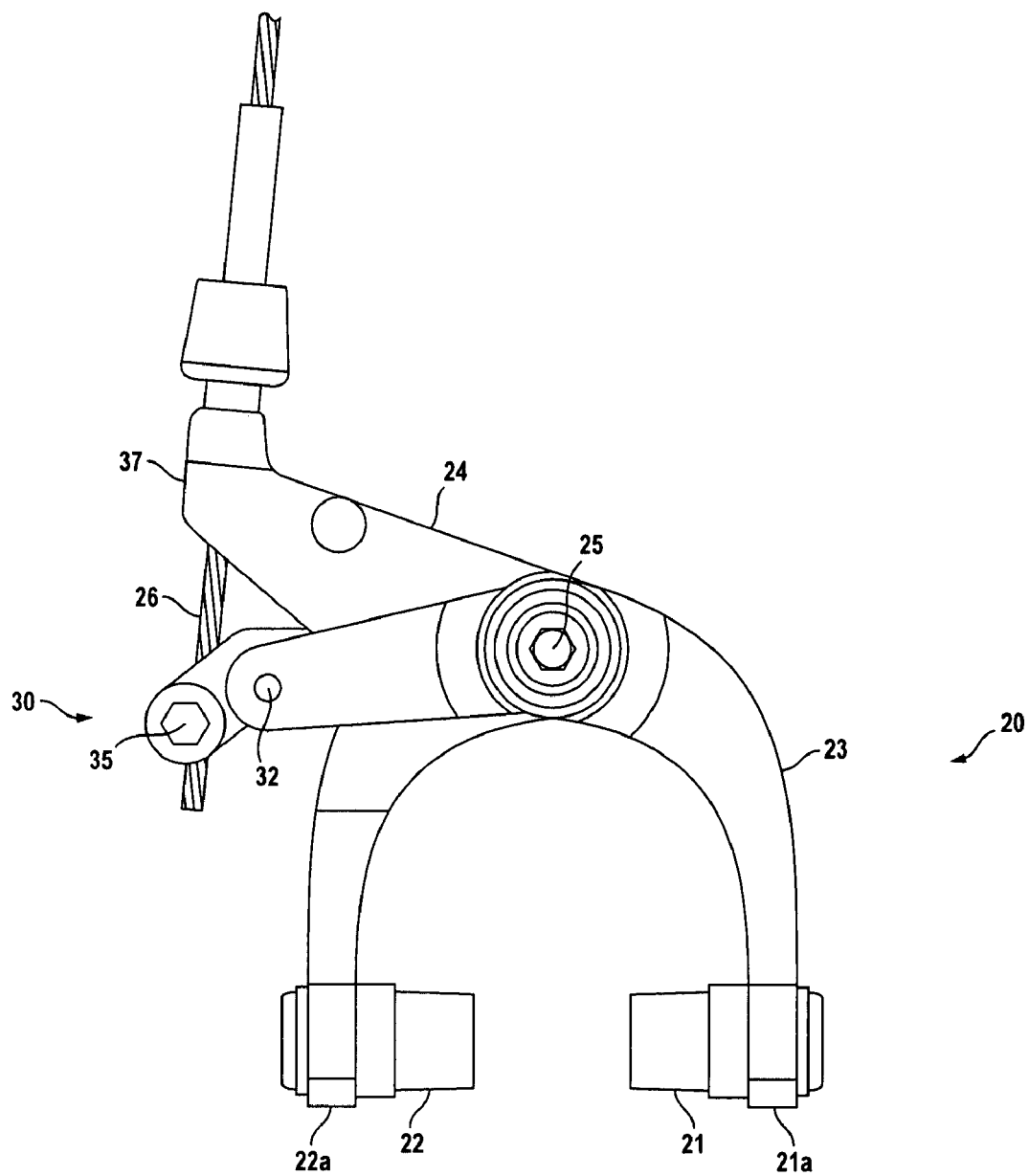
FIG. 2 is a side plan view of the caliper brake of the present invention.

Turning first to FIG. 2, caliper brake assembly 20 of the present invention is shown. The caliper brake assembly includes first brake arm 23 and second brake arm 24 having brake pads 21 and 22, respectively, supported on first ends 21a and 22a thereof.

Figure 1:
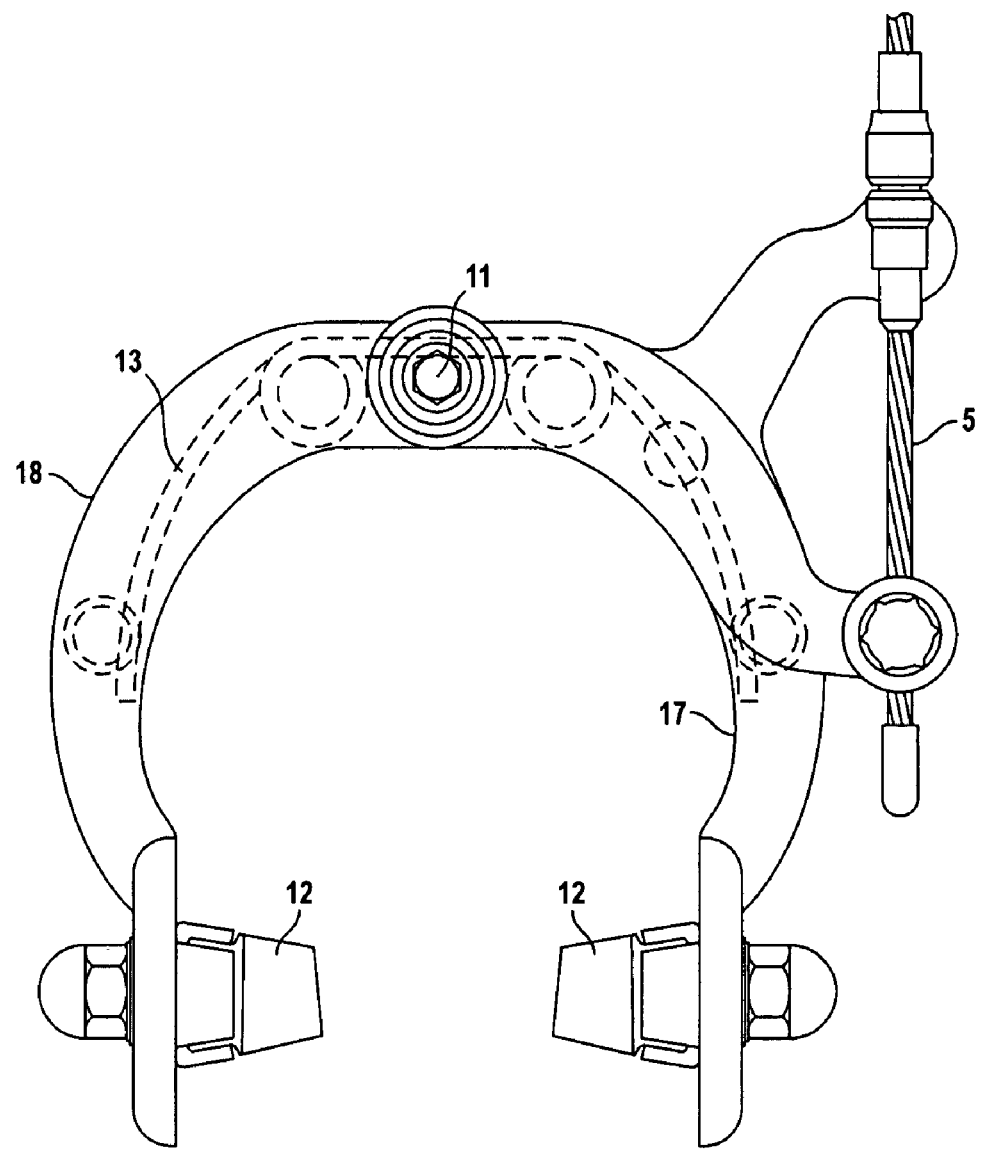
FIG. 1 is a side plan view of a caliper brake of the prior art.
Figure 3:
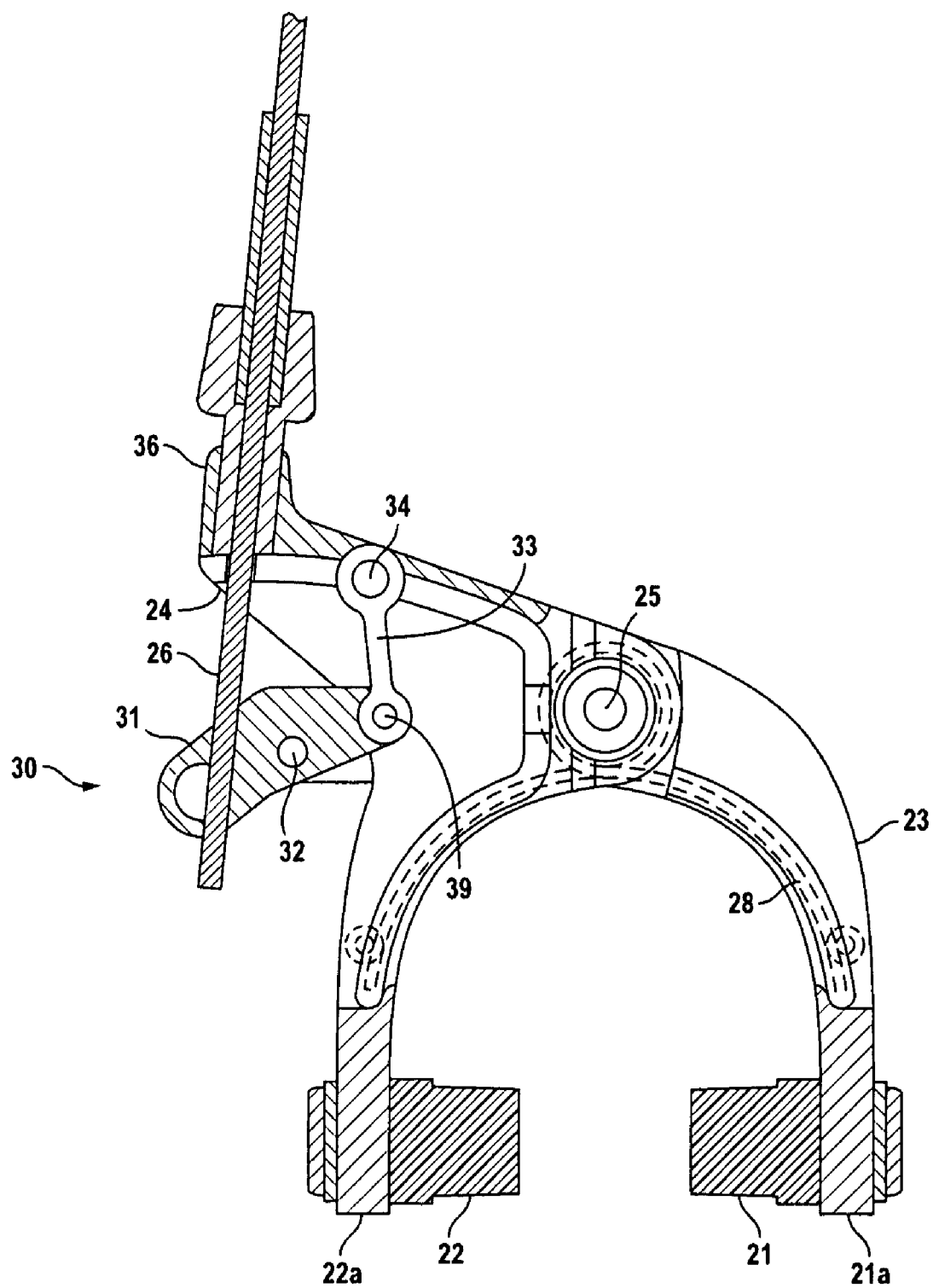
FIG. 3 is a cross-sectional plan view of the caliper brake assembly of FIG. 2 showing the internal details of the present invention.

As was the case with the prior art caliper brake assembly of FIG. 1, first and second brake arms 23 and 24 are provided with bores extending therethough for receiving bolt 25 for providing a pivot point for the pivotal attachment of the brake arms to the bicycle frame. Spring 28 (FIG. 3) is associated with first and second brake arms 23 and 24 to bias brake pads 21 and 22 away from the rimmed wheel such that when the braking action is interrupted through execution of an appropriate hand brake assembly, pads 21 and 22 are spaced away from the rimmed wheel to prevent unintended frictional contact.

The thrust of the present invention is the inclusion of rocker assembly 30. Rocker assembly 30 includes rocker arm 31 pivotally appended to the second end of first brake arm 23 at pin 32 (FIG. 1). The rocker arm 31 is also provided with fastener 35 for fixedly receiving control cable 26 that passes through opening 36 of second brake arm 24. As such, as control cable 26 is actuated through the activation of a suitable hand brake, rocker arm 31 extends upwardly about pivot pin 32. Control cable 26 remains fixed to rocker arm 31 through the use of screw or bolt 35, again, as shown in FIG. 2.

In order to complete the assembly, link 33 is provided for pivotally connecting rocker arm 31 to a region proximate end 37 of second brake arm 24. As such, as control cable 26 is withdrawn through appropriate hand brake actuation, rocker arm 31 pivots about pin 32 causing the end of rocker arm 31 that is attached to control cable 26 to move upwardly and link 33 to move downwardly about pivot pins 34 and 39, which, in turn, acts to move brake pads 21 and 22 inwardly against the rim of the associated bicycle wheel. Link 33 can act through either compression or tension between rocker arm 31 and second brake arm 24.

In summary, rocker assembly 30 increases the mechanical advantage that exists through the actuation of control cable 26 of a typical Bowden cable. This invention is ideally applicable to single pivot style caliper brakes of the type illustrated in FIG. 1. In other words, both brake arms 23 and 24 pivot about a single point also used for mounting brake 20 on a suitable bicycle. The rocker assembly amplifies the force at pivot 32. It is the sum of forces of link 33 and cable 26. Points 34 and 35 see the same force, as link 33 (tension and compression) is a two force member. Thus, the braking action provided by a user in actuating control cable 26 is amplified at brake pads 21 and 22 providing a more efficient braking action for a given amount of hand applied force.

What is claimed is:

1. A caliper brake assembly for engaging a rimmed wheel on a frame of a bicycle comprising first and second brake arms, said second and first brake arms having brake pads supported on first ends thereof and bores extending therethrough for receiving a bolt for providing a pivot point for the pivotal attachment of said first and second brake arms to said frame, a spring associated with said first and second brake arms to bias said brake arms away from said rimmed wheel, a rocker assembly comprising a rocker arm pivotally appended to a second end of said first brake arm, said rocker arm having a region for fixedly receiving a control cable and a region for pivotally receiving a link, the link provided for pivotally connecting said rocker arm proximate to a second end of said second brake arm both in compression and tension wherein said control cable is received at one end of said rocker arm and said link is pivoted at an opposite end of said rocker arm and further said rocker arm is pivoted between said control cable and link to said first brake arm.

2. The caliper brake assembly of claim 1 wherein said control cable passes through an opening at the second end of said second brake arm and is fixedly attached to said rocker arm.

3. The caliper brake assembly of claim 2 further comprising a screw or bolt for fixedly attaching said control cable to said rocker arm.

4. The caliper brake assembly of claim 1 further comprising a pin sized to pass through in an opening in said rocker arm for pivotally attaching said link thereto.

5. The caliper brake assembly of claim 1 further comprising a pin sized to pass through an opening proximate the second end of said second brake arm for pivotally attaching said link thereto.

* * * * *